United States Patent
Kitajima

(10) Patent No.: US 7,505,633 B2
(45) Date of Patent: Mar. 17, 2009

(54) IMAGE PROCESSING APPARATUS, METHOD, PROGRAM AND STORAGE MEDIUM

(75) Inventor: Kotaro Kitajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 863 days.

(21) Appl. No.: 10/811,939

(22) Filed: Mar. 30, 2004

(65) Prior Publication Data

US 2004/0202381 A1  Oct. 14, 2004

(30) Foreign Application Priority Data

Apr. 9, 2003  (JP)  ............................. 2003-105211

(51) Int. Cl.
G06K 9/36  (2006.01)
(52) U.S. Cl. .................. 382/276; 382/284; 382/294; 358/540; 358/450
(58) Field of Classification Search ................ 382/274, 382/275, 284, 293, 294; 358/3.26, 3.27, 358/463
See application file for complete search history.

(56) References Cited

U.S. PATENT DOCUMENTS

| | | | |
|---|---|---|---|
| 5,224,181 A | | 6/1993 | Tsutsumi ..................... 382/61 |
| 5,625,710 A | * | 4/1997 | Katsuyama et al. ......... 382/209 |
| 5,754,299 A | * | 5/1998 | Sugaya et al. ............... 356/401 |
| 6,005,637 A | * | 12/1999 | Suzuki ....................... 348/584 |
| 6,020,931 A | * | 2/2000 | Bilbrey et al. .............. 348/584 |
| 6,640,305 B2 | * | 10/2003 | Kocher et al. .............. 713/194 |
| 6,643,230 B2 | * | 11/2003 | Furukawa ................ 369/44.23 |
| 6,674,485 B2 | * | 1/2004 | Akiyama et al. ........... 348/586 |
| 6,677,942 B1 | * | 1/2004 | Rushmeier et al. ......... 345/420 |
| 6,791,616 B2 | * | 9/2004 | Tamaki et al. .............. 348/335 |
| 6,816,625 B2 | * | 11/2004 | Lewis et al. ................ 382/275 |
| 6,850,651 B2 | * | 2/2005 | Zaklika et al. ............. 382/275 |
| 6,919,892 B1 | * | 7/2005 | Cheiky et al. .............. 345/473 |
| 7,015,954 B1 | * | 3/2006 | Foote et al. .............. 348/218.1 |
| 7,027,054 B1 | * | 4/2006 | Cheiky et al. .............. 345/473 |
| 7,046,401 B2 | * | 5/2006 | Dufaux et al. .............. 358/450 |
| 7,154,622 B2 | * | 12/2006 | Constantin et al. ........ 358/1.15 |

FOREIGN PATENT DOCUMENTS

JP  2000-125175  4/2000

OTHER PUBLICATIONS

Chinese Office Action issued on Jul. 8, 2005, in Chinese Patent Application No. 2004100307213.

* cited by examiner

Primary Examiner—Yosef Kassa
(74) Attorney, Agent, or Firm—Fitzpatrick, Cella, Harper & Scinto

(57) ABSTRACT

An image processing apparatus that generates image data from which it can be determined from the processed image what kind of processing has been performed on the image, and that enables bulge correction of the image and transformation of the image to be carried out with ease.

15 Claims, 16 Drawing Sheets

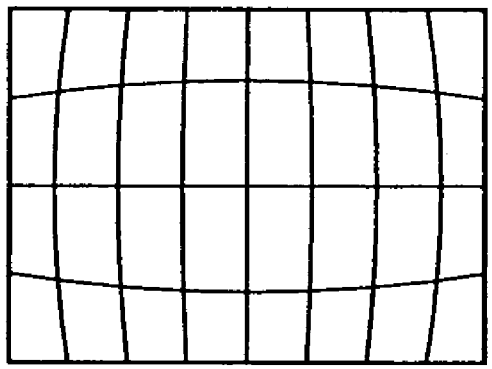
F I G. 5A
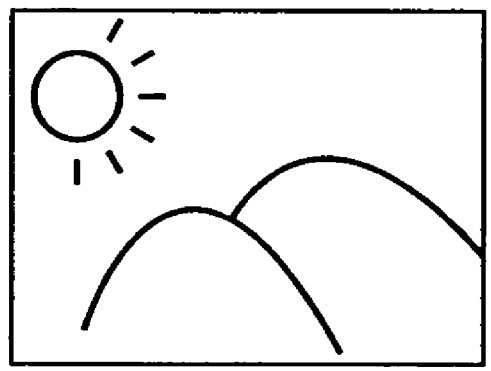
F I G. 5B
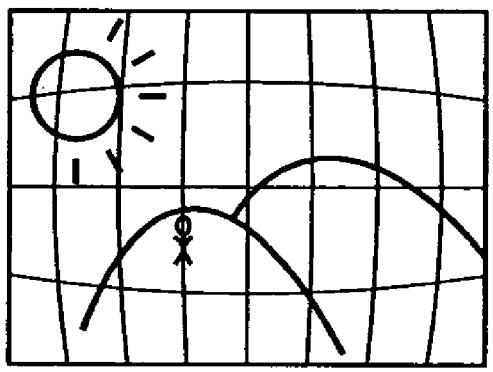
F I G. 5C

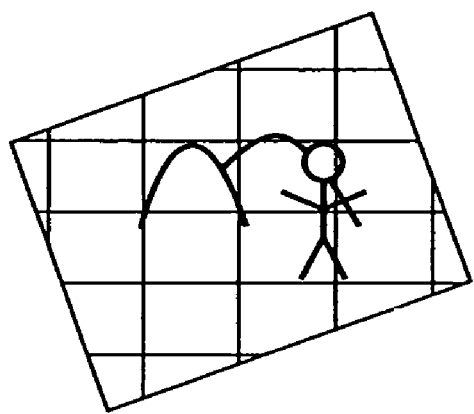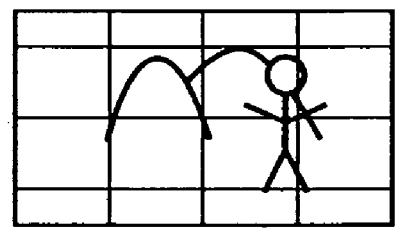
F I G. 12A    F I G. 12B

BARREL TYPE

SPOOL TYPE

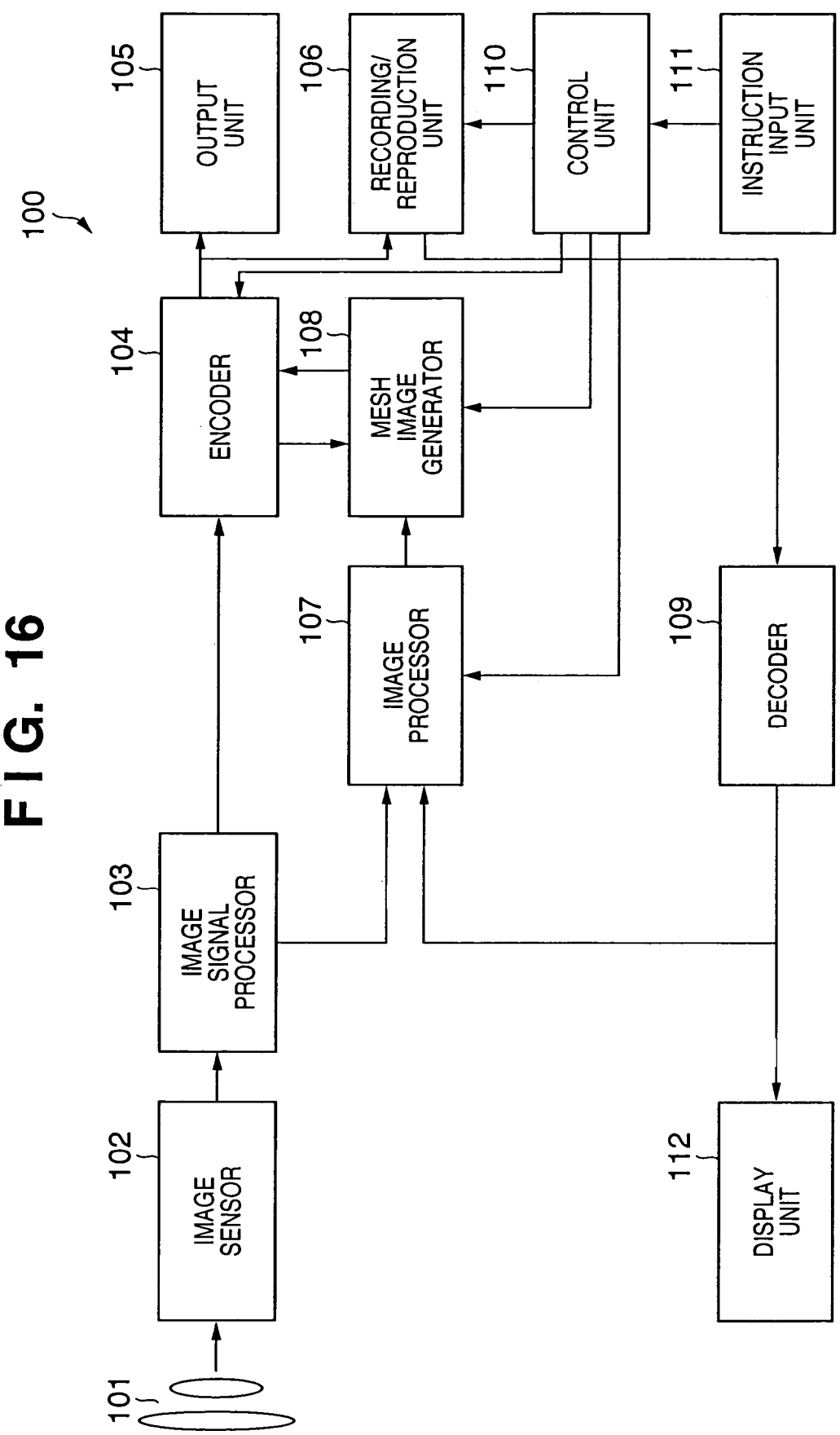

IMAGE PROCESSING APPARATUS, METHOD, PROGRAM AND STORAGE MEDIUM

FIELD OF THE INVENTION

The present invention relates to an image processing apparatus, method, program and storage medium for generating image data that can be easily edited and stored.

BACKGROUND OF THE INVENTION

Conventionally, as apparatuses that can sense an image for recording and reproduction, a digital still camera and a digital video camera are known. So-called retouching is often performed on the image data acquired by such apparatuses, involving downloading the image data to a personal computer (PC) and editing and processing the image data on the PC.

As examples of such retouching, there is changing the size, color, brightness, shape, etc. of the image, or projecting the image onto a three-dimensional surface. Additionally, correction of lens bulge, arising at the image sensed by an image-sensing apparatus such as a digital still camera, is also one type of such image processing.

These types of processing are typically performed on a PC using image editing software. FIGS. 13A and 13B show examples of transforming an image using image editing software, with FIG. 13A showing an example of reducing the original image vertically and FIG. 13B showing an example of adding a special effect that twists the original image from the center.

However, when editing or processing the image, for example, transforming the size of the image, adding special effects, or the like, as described above with the conventional art, although the editing record during editing with the image editing software can remain in memory, the editing record cannot be known from the image data stored after editing is finished.

Therefore, when one wants to know the content of the editing carried out in the past from the image data after the image data is saved, one can only guess from the reproduced image itself.

At the same time, due to the impact of a bulge of the lens that cannot be completely eliminated in the lens design, an image sensed via an optical system experiences bulges called barrel-type and spool-type as shown in FIGS. 14A and 14B, respectively. In particular, it is known that bulge increases markedly when using a wide-angle lens. As a procedure for performing this type of image bulge correction of an image, Japanese Laid-Open Patent Publication (Kokai) No. 2000-125175 discloses a procedure involving attaching to the image correction bulge parameters calculated on the basis of characteristics of the image-sensing apparatus that sensed the image, using these parameters to carry out gross automatic correction, and thereafter fine-tuning the image manually while observing the image. As shown in FIG. 15, this fine-adjustment procedure involves correcting the image so that any visual bulge disappears by using utility poles or other such essentially straight vertical portions in the image as a reference.

However, when using a correction tool and manually correcting the image while observing the image, it is very difficult to make the proper adjustments if there are no vertical straight lines like those shown in the example in FIG. 15 included in the image that can be used as references.

SUMMARY OF THE INVENTION

Accordingly, the present invention is conceived as a response to the above-described disadvantages of the conventional art, and has as an object to provide an image processing apparatus, method, program and storage medium that generates image data from which it can be determined from the processed image what kind of processing has been performed on the image, and that can be easily subjected to bulge correction and restoration.

In order to achieve the above-described object, according to one aspect of the present invention, there is provided an image processing apparatus comprising an input unit for inputting image data, and an attachment unit for attaching mesh image data as a component of the input image data.

In order to achieve the above-described object, according to another aspect of the present invention, there is provided an image processing method comprising an input step of inputting image data, and an attachment step of attaching mesh image data as a component of the input image data.

Other objects, features and advantages of the present invention will be apparent from the following description when taken in conjunction with the accompanying drawings, in which like reference characters designate the same or similar parts throughout the figures thereof.

BRIEF DESCRIPTION OF THE DRAWINGS

FIGS. 5A, 5B and 5C are diagrams showing a basic image and a mesh image distorted by bulge aberration;

FIGS. 12A and 12B are diagrams illustrating correction of an image tilted at an angle;

FIG. 16 is a diagram showing a configuration of an image processing apparatus according to a first embodiment of the present invention.

DETAILED DESCRIPTION OF THE PREFERRED EMBODIMENTS

A preferred embodiment of the present invention is now described in detail, with reference to the accompanying drawings. It should be noted that the relative arrangement of the components, the numerical expressions and numerical values set forth in these embodiments do not limit the scope of the present invention unless it is specifically stated otherwise.

First Embodiment

A description is now given of a first embodiment of the present invention.

As an initial matter, it should be noted that image data is generally composed of three basic components, (R, G, B) and (Y, Cr, Cb). Besides these three basic components, there is that which is sometimes added to the image as an additional component. For example, that which indicates the transmittivity of the image is known. In the first embodiment of the present invention, a description is given of a technology involving attaching a component composed of a mesh-like image (hereinafter referred to as a mesh component) as this additional component.

Figure 1:
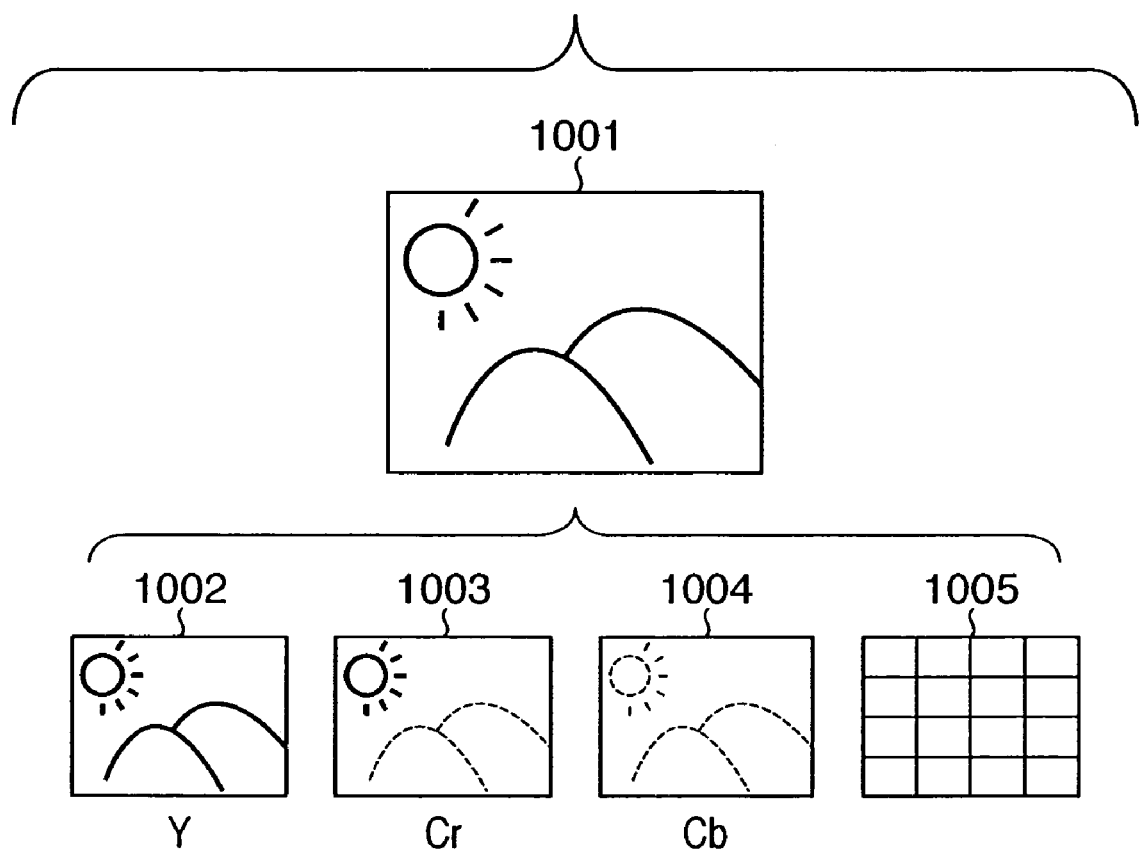
FIG. 1 is a diagram showing image data described with respect to a first embodiment of the present invention.

FIG. 1 is a diagram showing image data described with respect to a first embodiment of the present invention.

In FIG. 1, reference numeral 1001 denotes an image sensed by a digital video camera and a digital still camera, or a digital image drawn by a drawing tool or the like (computer graphics). Additionally, reference numerals 1002, 1003 1004 and 1005 denote components of which the image 1001 is comprised. Here, the term "components" means constituent elements of the image, such as (R, G, B) and (Y, Cr, Cb). Reference numeral 1002 denotes a brightness component (Y), 1003 denotes a red color difference component (Cr), 1004 denotes a blue color difference component (Cb) and 1005 denotes a mesh component to be described later. The mesh component 1005 is expressed as digital image data. Even when added as an additional component, however, the amount of information is relatively small, because the mesh image is a plain binary image, and therefore, by using an appropriate encryption means, it is possible to restrain the increase in the overall amount of image data.

Next, how an image that includes a mesh image as an additional component is to be used is described with reference to FIG. 2.

Figure 2:
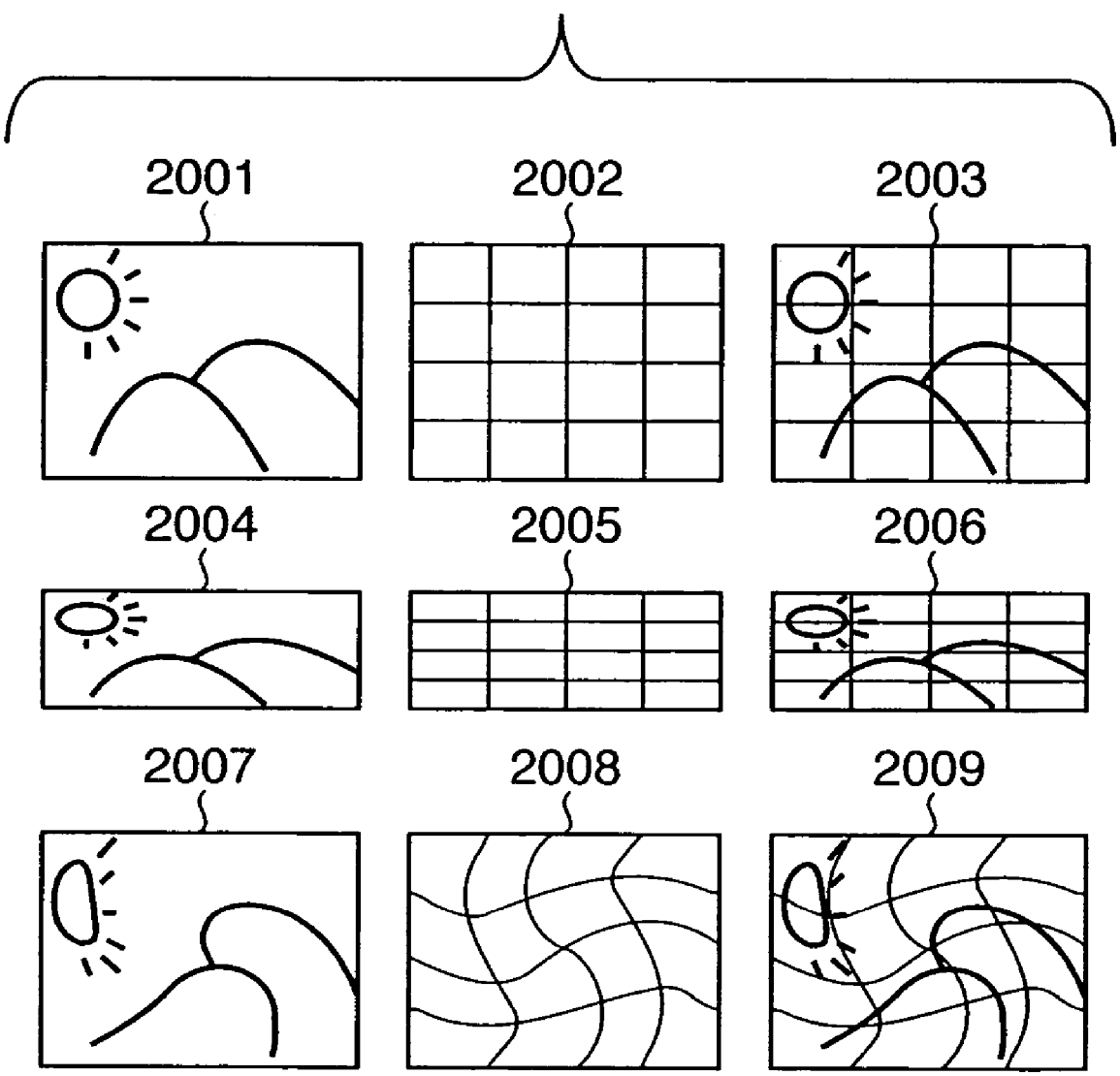
FIG. 2 is a diagram showing an example of transforming a basic image and a mesh image.

FIG. 2 is a diagram showing an example of transforming a basic image and a mesh image. Reference numerals 2001, 2004 and 2007 denote images displaying only the basic components of the image (YCrCb), 2002, 2005 and 2008 denote images displaying only the additional mesh image component and 2003, 2006 and 2009 denote images displaying the basic components (YCrCb) and the mesh image simultaneously.

As shown in FIG. 2, the image data of the present invention is displayed only as an image made from the basic components like 2001, 2004 and 2007 during normal image display. However, it is possible to display only the mesh components like 2002, 2005 and 2008, or to simultaneously display the basic components and the additional components like 2003, 2006 and 2009. As will be described in detail later, in the present invention, by storing transformation information based on image transformation and processing, the mesh component is configured so that later the state of transformation of the image can be known even after processing.

Next, a description is given of an image processing apparatus according to a first embodiment of the present invention for handling the image data described above. FIG. 16 is a diagram showing an example of a configuration of an image processing apparatus according to a first embodiment of the present invention. Here, an image processing apparatus 100 may be a digital still camera, a digital video camera and recorder or the like.

In FIG. 16, reference numeral 101 denotes an optical system, 102 denotes an image sensor, 103 denotes a sensed image signal processor, 104 denotes an encoder that compresses and encodes an input image using a compression method such as MPEG, JPEG or JPEG 2000, 105 denotes an external output unit for the compressed and encoded image data, 106 denotes a recording/reproduction unit that includes a storage medium that stores the compressed and encoded image data, 107 denotes an image processor that edits and processes the input image, 108 is a mesh image generator that generates and processes a mesh component based on the processing information processed by the image processor 107, 109 denotes a decoder for decoding the compressed and encoded image data, 110 denotes a controller that controls the operation of the parts, 111 denotes an instruction input unit for inputting user commands, and 112 denotes a display unit adapted to display the restored image and the mesh image.

Next, a brief description is given of the operating flow of the image processing apparatus 100.

First, the optical system 101 is activated and the image signal sensed by the image sensor 102 is digitized by the image signal processor 103 and predetermined image processing is performed. During normal output or recording, image data processed by the image processor 103 (that is, basic components (YCrCb)) is compressed and encoded as is by the encoder 104 and either output externally from the output unit 105 or recorded by the recording/reproduction unit 106. At this time, the plain mesh component generated by the mesh image generator 108 (an unchanged mesh image like that 1005 in FIG. 1) may also be added and the combined image may be compressed and encoded.

During image processing and either output or recording, the original image processed by the image signal processor 103 is transformed or processed by the image processor under the control of the controller 110 issuing control commands in accordance with user commands input from the instruction input unit 111. Next, the mesh image generator 108 generates a plain mesh component (1005 in FIG. 1), and further, transforms the plain mesh component depending on the content of the processing carried out by the image processor 107. Next, the image data transformed by the image processor 107 and the post-transformation mesh component generated by the mesh image generator 108 are compressed and encoded by the encoder 104 and output externally by the output unit 105 or recorded by the recording/reproduction unit 106.

Additionally, during normal reproduction, the compressed and encoded data reproduced by the recording/reproduction unit 106 is decoded by the decoder 109 and the basic components (YCrCb) and the mesh component of which the image data is comprised are decoded. The decoded reproduction image and the mesh image can then be displayed as either a reproduction image only, a combination of the reproduction image and a mesh image, or the mesh image only.

Further, during processing of the reproduction image and either output or re-recording, the basic components (YCrCb) and the mesh component decoded by the decoder 109 are transformed by the image processor 107 under the control of the controller 110 issuing control commands in accordance with user commands input from the instruction input unit 111. Transforming the reproduction image in this manner involves transforming the shape of the reproduced mesh component according to what processing is performed by the image processor 107.

Describing the foregoing operations using FIG. 2 as an example, the images 2004 and 2007 are images generated by the digital camera 100 transforming the original image 2001 in each of two ways. More specifically, the image 2004 changes the vertical size of the original image 2001, whereas the image 2007 represents a twisting of the original image 2001.

When transforming an image in the ways shown in FIG. 2 using the digital camera 100, if the original image 2001 is transformed so as to obtain an image like image 2004, then, together with the original image 2001, the mesh component 2002 corresponding to original image 2001 is also transformed so as to obtain an image like image 2005. The post-transformation image data (including the mesh component) is then saved as either new or rewritten. Similarly, if the original image 2001 is transformed so as to obtain an image like image 2007, then, together with the original image 2001, the mesh component 2002 corresponding to the original image 2001 is also transformed so as to obtain an image like image 2008. The post-transformation image data (including the mesh component) is then saved as either new or rewritten image data.

The foregoing describes the first embodiment of the present invention. In the foregoing description, although three components Y, Cr and Cb are used as the basic components, other components besides these three may be used as the basic components. Additionally, either a brightness component alone or a color component alone may be used as the basic component.

As described above, referentially displaying the mesh component of the transformed image makes it possible to determine easily what kind of transformation has been carried out on the image. Moreover, for example, if one wishes to restore image 2007 to its pre-transformation state like image 2001, by using the digital camera 100 described above to untwist the mesh image 2008 (in this case a plain mesh) so as to obtain the original mesh image 2002, the image can be transformed into the original image and can be fine-tuned visually easily as well.

According to the configuration described above, by adding a mesh component as one of the components of an image causes the mesh image to change in a manner corresponding to the alterations in the basic component image, and therefore the state of the alteration can be grasped easily and the image can be restored to its original form easily as well. That is, how the image has been processed can be determined from the post-processed image, and moreover, such operations as bulge aberration correction and image restoration can be carried out easily.

Second Embodiment

A description is now given of a second embodiment of the present invention.

Figure 3:
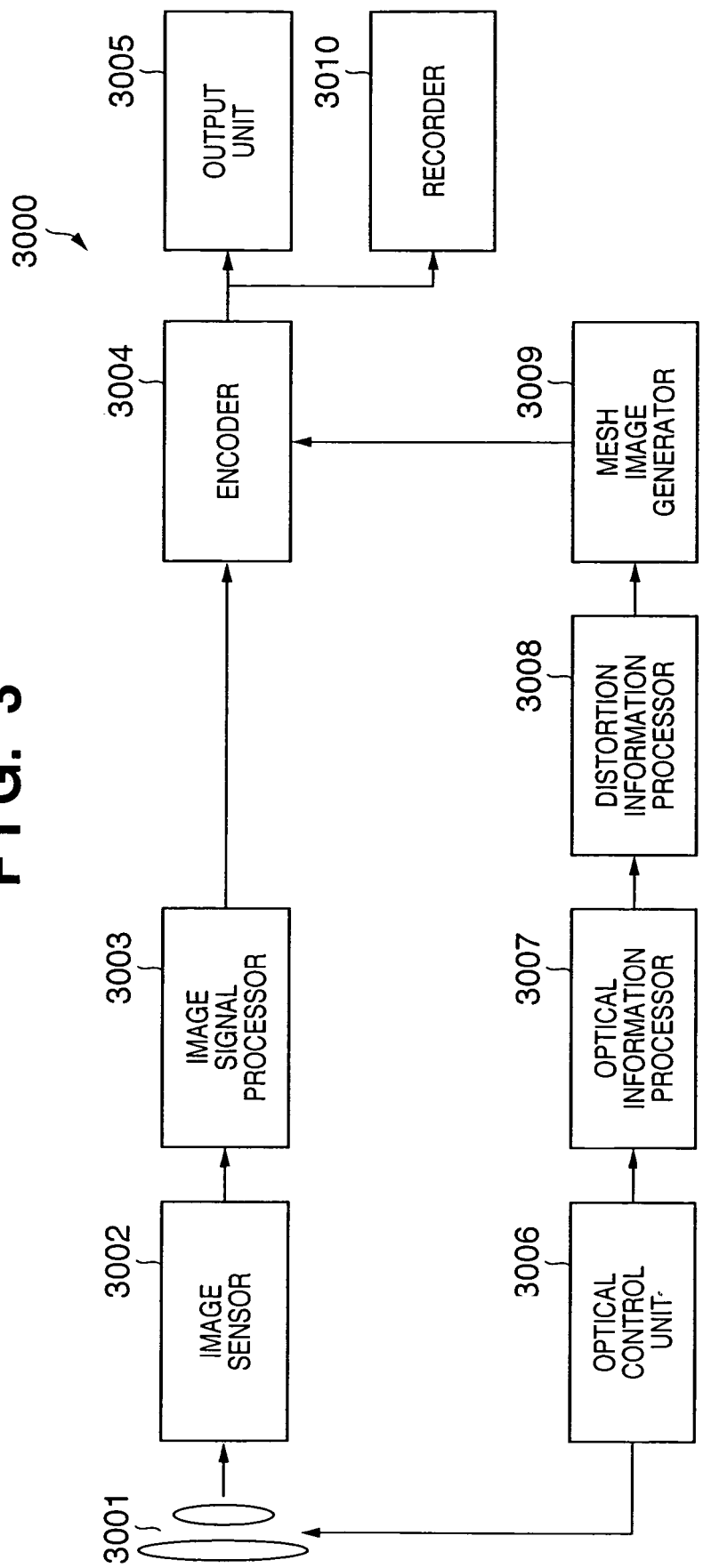
FIG. 3 is a block diagram showing a configuration of an image processing apparatus according to a second embodiment of the present invention.

FIG. 3 is a block diagram showing a configuration of an image processing apparatus according to a second embodiment of the present invention. It should be noted that an image processing apparatus 3000 may be a digital still camera or a digital video camera and recorder.

In FIG. 3, reference numeral 3001 denotes an optical system into which light rays from an object are projected, reference numeral 3002 denotes an image sensor having a image sensing element such as a CCD or CMOS, 3003 denotes a sensed image signal processor, 3004 denotes an encoder that compresses and encodes the image signal, 3005 denotes an external output unit for the compressed and encoded data, 3006 denotes an optical control unit for controlling the zoom magnification and focus adjustment of the optical system, 3007 denotes an optical information processor that acquires from control signals issued by the optical control unit information on the optical system such as the zoom state and the focus state, 3008 denotes a distortion information processor that generates a deliberately distorted mesh image according to distortion information on the acquired image, and 3010 denotes a compressed and encoded image data recorder.

Next, a description is given of the operation of the image processing apparatus 3000.

When light beams are projected from the object into the image sensor 3002 of the optical system 3001, sensed image signals are output from the image sensor 3002. These sensed image signals are then input to the image signal processor 3003, digitized, color separated, γ-corrected and otherwise signal processed to form object image data.

The zoom and focus of the optical system 3001 are controlled by the optical control unit 3006. The control signals that the optical control unit 3006 issues are also input to the optical information processor 3007, where the state of the zoom and focus are acquired from the control signals as optical system information and output to the distortion information processor 3008. The distortion information processor 3008 detects bulge aberration appearing in the image data during image sensing and generates bulge aberration information based on the optical system information indicating the state of the zoom and focus.

Figure 4A:
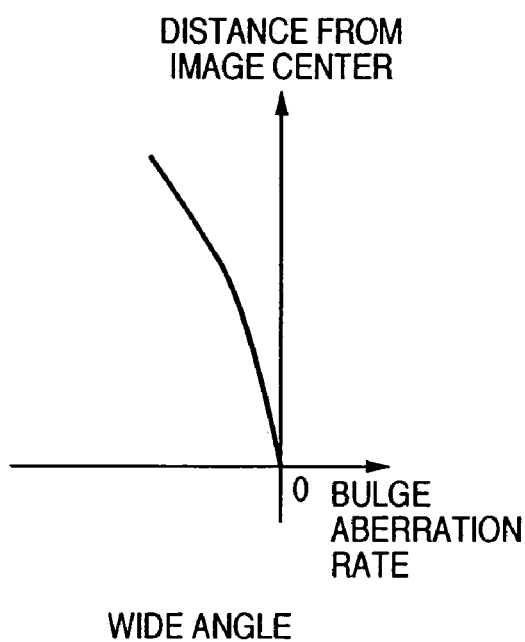
FIGS. 4A and 4B are diagrams illustrating bulge aberration rates.
Figure 4B:
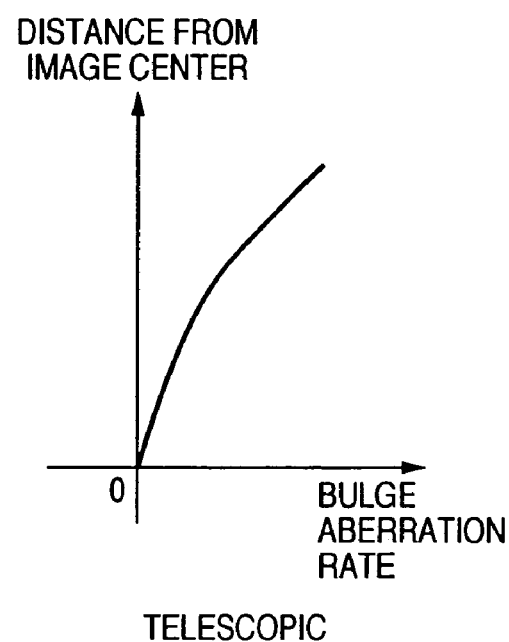

FIGS. 4A and 4B are diagrams illustrating bulge aberration rates, specifically, a case in which ordinary bulge aberration appears according to a zoom state and a wide-angle state. The graphs in FIGS. 4A and 4B graph distance from the center of the image against bulge aberration rate. The bulge aberration rate is defined as $(L-L')/L$, where L is a height of an object obtained in an ideal case of no distortion and L' is a height of an object in a state of distortion. FIG. 4A shows distortion when the lens is on the wide-angle side, in which bulge aberration in a negative direction (barrel-type) increases as the distance from the pixel to the center of the image increases. FIG. 4B shows distortion when the lens is on the telescopic side, in which bulge aberration in a positive direction (spool-type) increases as the distance from the pixel to the center of the image increases.

There are a variety of methods of calculating of the bulge aberration according to lens state at the distortion information processor 3008. For example, zoom and focus state parameters may be input into a formula based on an existing algorithm in order to obtain the bulge aberration. Alternatively, a table or the like showing the relation between zoom and focus state parameters, on the one hand, and the proportion of distortion on the other, may be prepared in advance, and such a table used to obtain the bulge aberration. In other words, any method may be used that permits bulge aberration information to be obtained from the state of the zoom and focus. It should be noted that the bulge aberration information generated by the distortion information processor 3008 is output to a mesh image generator 3009.

FIGS. 5A, 5B and 5C are diagrams showing a basic image and a mesh image distorted by bulge aberration. The mesh image generator 3009 generates a mesh image distorted according to the bulge aberration information. For example, if it is determined from the bulge aberration information that a sensed image is barrel-distorted, then the mesh image generator 3009 generates a mesh image having barrel-type distortion like that shown in FIG. 5A as an additional component (mesh component). In this case, a mesh image is formed based on bulge aberration information like that of the graph in FIG. 4B. A mesh image generated in the foregoing manner has the same distortion shown in FIG. 5B as the image of the object input through the optical system 3001.

The mesh image generated by the mesh image generator 3009 is input to the encoder 3004. The encoder 3004 compresses and encodes as a fourth component the mesh image together with the basic components (YCrCb) of the image of the object.

By configuring the image processing apparatus as described above, a mesh image corresponding to the bulge aberration of the image can be included in the image as a component thereof. Additionally, the compressed and encoded image data can be output from the output unit 3005 to an external device or network, or can be recorded and/or reproduced by the data recorder 3010.

Moreover, by decoding the compressed and encoded image data and restoring the image and mesh image, basic components of the image and a mesh component of the mesh image can be displayed simultaneously as shown in FIG. 5C.

Next, using the mesh image described above, a description is given of a method of correcting lens distortion. In the configuration described above, the mesh image is generated together with the basic components as a mesh component, taking distortion into account. As a result, a distortion-free image of the object can be obtained by transforming using an image correction tool or the like so that the mesh of the mesh image during reproduction or after restoration become straight vertical lines.

Figure 6:
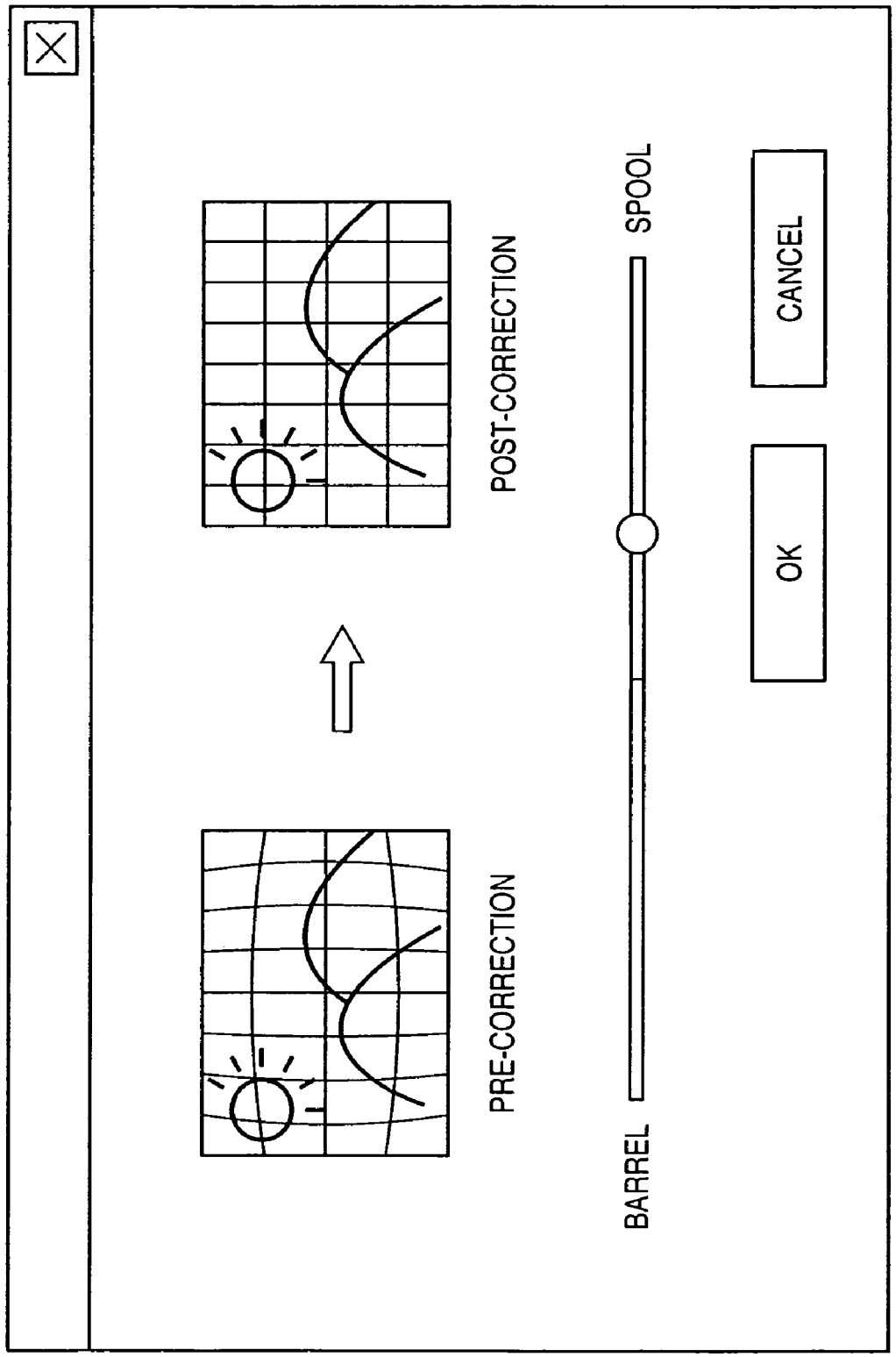
FIG. 6 is a diagram showing an example of an image correction tool for the purpose of correcting bulge aberration, which can be operated by a PC.
Figure 15:
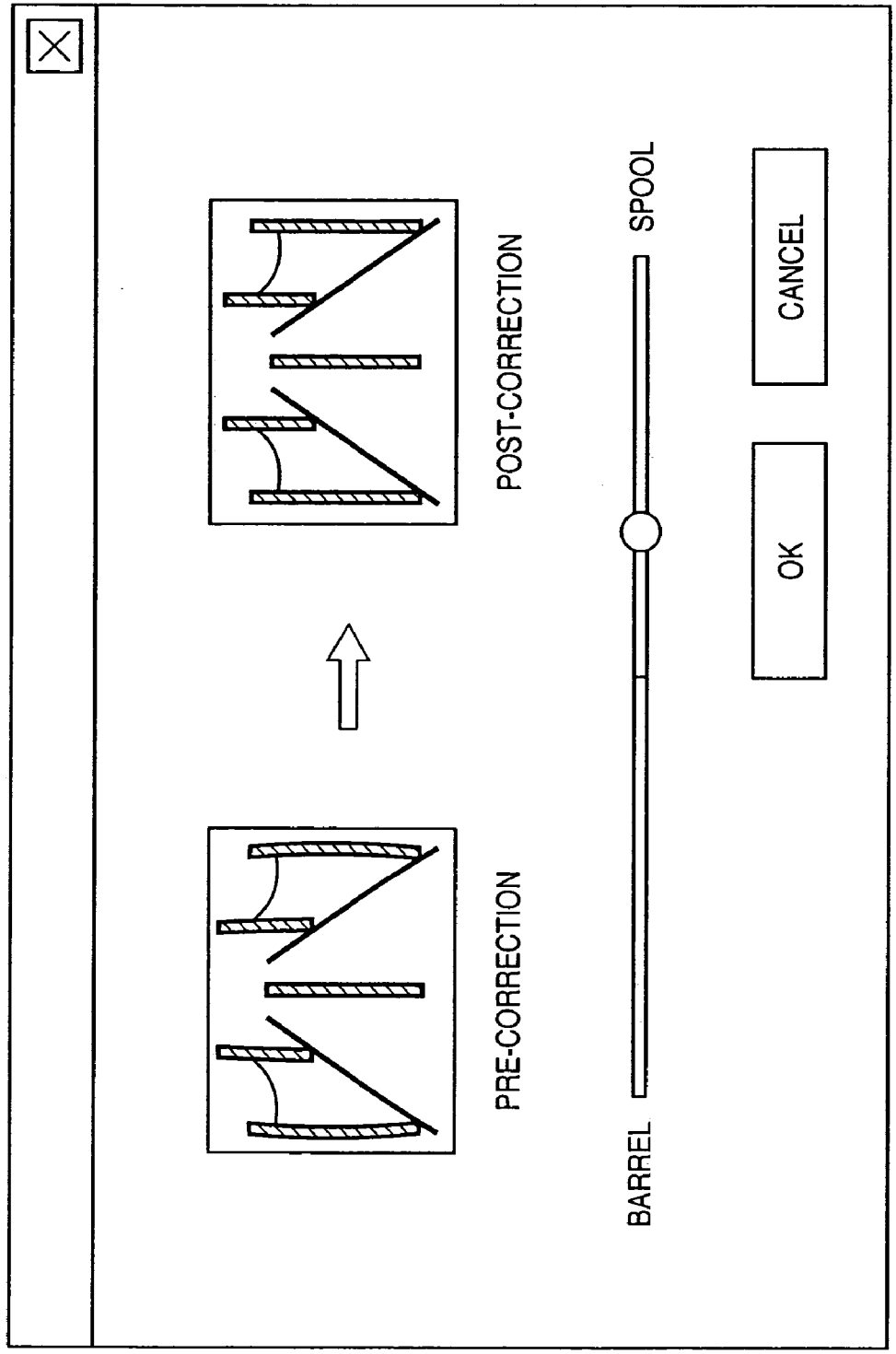
FIG. 15 is a diagram showing an example of correction using the conventional image editing software.

FIG. 6 is a diagram showing an example of an image correction tool for the purpose of correcting bulge aberration, which can be operated by a PC. The image correction tool shown in FIG. 6, like that shown in FIG. 15, is one that manually adjusts the aberration while observing the image. However, the image correction tool shown in FIG. 6 differs from the conventional image correction tool shown in FIG. 15 insofar as, when the image data to be corrected using the image correction tool is scanned, the integrally encrypted image data and the mesh image are decoded so as to simultaneously display both the basic components and the mesh component.

By simultaneously displaying the basic components and the mesh component, even if the sensed object is does not include any straight lines, accurate bulge aberration correction can still be carried out by using the meshes as references so that the mesh vertical and horizontal lines become straight.

Moreover, as one embodiment of the image processing apparatus 3000, matters may be arranged so as to generate a mesh image that is distorted according to the zoom and focus during image sensing, the distorted mesh image combined with the sensed image, and the combined image then displayed on a liquid crystal display (LCD) or electronic viewfinder, not shown, with which the image processing apparatus 3000 is equipped, so that the operator can confirm the distortion during image sensing.

Figure 7:
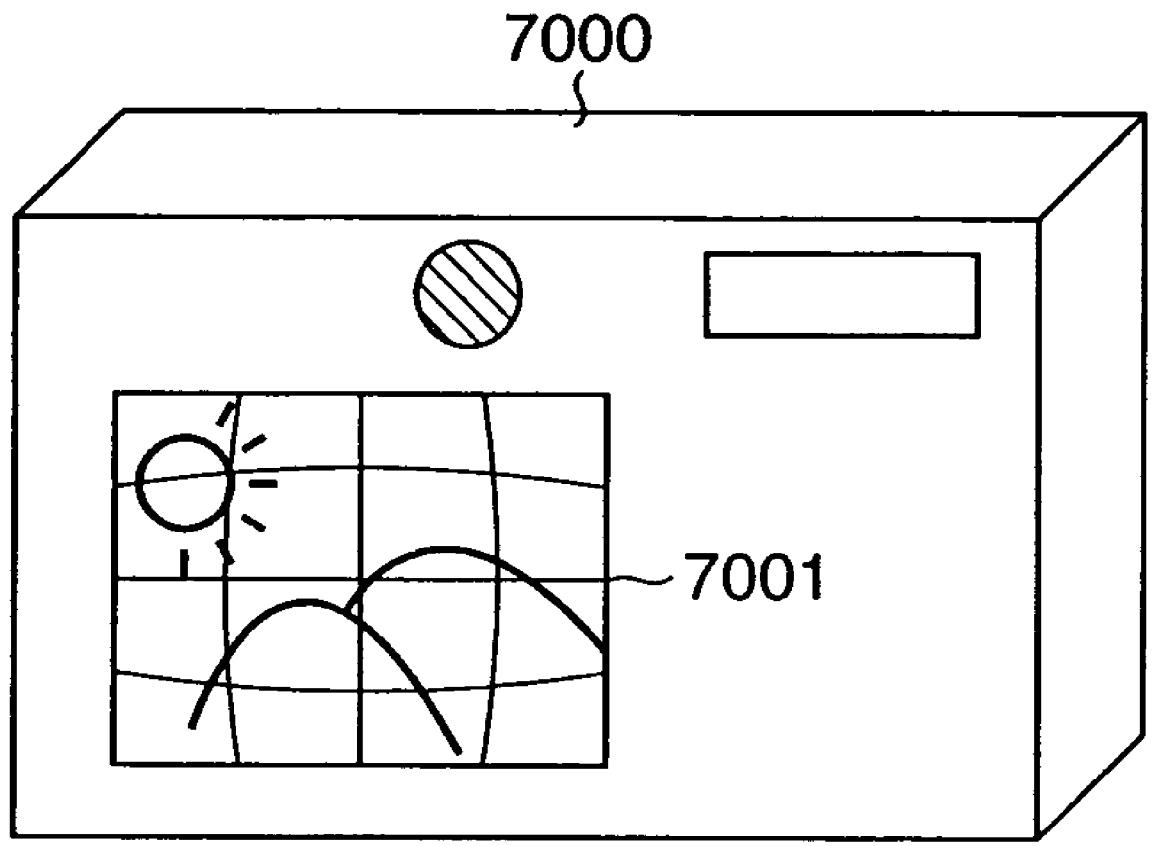
FIG. 7 is a schematic diagram showing an image processing apparatus.

Such a configuration is described with reference to FIG. 7. FIG. 7 is a schematic diagram showing an image processing apparatus.

In FIG. 7, reference numeral 7000 denotes an image processing apparatus main unit and 7001 denotes an LCD provided on a back surface of the image processing apparatus, with the LCD 7001 simultaneously displaying an image of an object during sensing and a mesh image distorted according to that image. That is, FIG. 7 shows an example of a simultaneous display of the basic components of the sensed image and the mesh component corresponding to that sensed image. According to such a configuration the operator can grasp the state of the distortion of the image during image sensing from the mesh image displayed on the LCD 7001, enabling the operator to sense the image while taking the distortion into account.

It should be noted that, although in FIG. 7 the LCD 7001 displays an image that combines the sensed image and the mesh image, alternatively, the apparatus may also be configured so as to enable the display of only the mesh image, by a mode switch or the like.

The foregoing constitutes the description of the second embodiment. According to the configuration described above, the bulge aberration of an image appearing in response to the state of the lens can be corrected easily using a mesh image during sensing or reproduction.

Third Embodiment

Next, a description is given of a third embodiment of the present invention, in which the mesh size is changed in tandem with the zoom proportion. The configuration of the third embodiment, like that of the second embodiment, is described using the image processing apparatus 3000 of FIG. 3 and the image sensing apparatus 7000 of FIG. 7 that is an example of the application of that image processing apparatus 3000.

In FIG. 3, a zoom control signal issued from the optical control unit 3006 is acquired by the optical information processor 3007 and is input via the distortion information processor 3008 to the mesh image generator 3009. The mesh image generator 3009 can generate a mesh image having a mesh size linked to the content of the zoom control signal (that is, the zoom magnification). A mesh image generated in this manner can be displayed as in FIG. 8.

Figure 8:
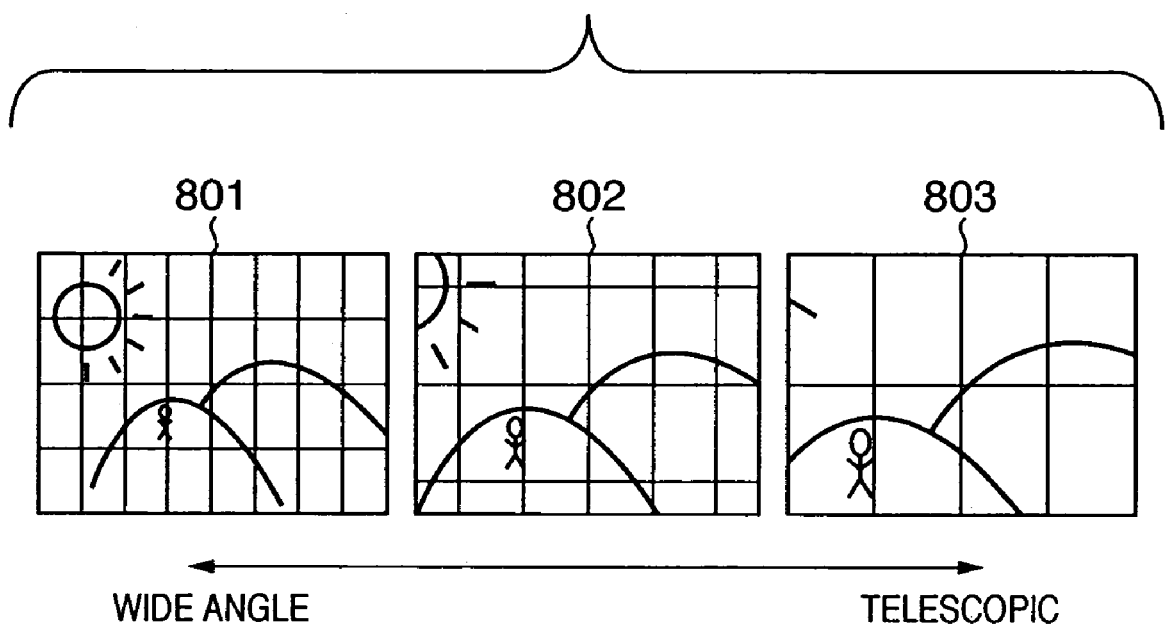
FIG. 8 is diagram showing examples of a combining of a basic image and a mesh image.

FIG. 8 is diagram showing examples of a combining of a basic image and a mesh image, that is, mesh image generated in accordance with the zoom magnification and displayed on the LCD 7001 of the image-sensing apparatus 7000. 801 in FIG. 8 shows an image sensed on the wide-angle side and 803 shows an image sensed on the telescopic side. 802 shows an image of zoom magnification intermediate between 801 and 803.

As shown by these display examples, with the wide-angle lens (that is, when the zoom magnification is low) the mesh size is small (fine), and with the telescopic lens (that is, when the zoom magnification is high) the mesh size is large (coarse).

It should be noted that it is of course possible to combine and to simultaneously display this type of zoom magnification-linked mesh image together with the mesh image having the distortion of the sensed image in accordance with the zoom and focus as described above with the second embodiment.

Further, a description is given, as a part of the present embodiment, of a configuration that combines two images sensed at different zoom magnifications and generates a panoramic image.

Figure 9A:
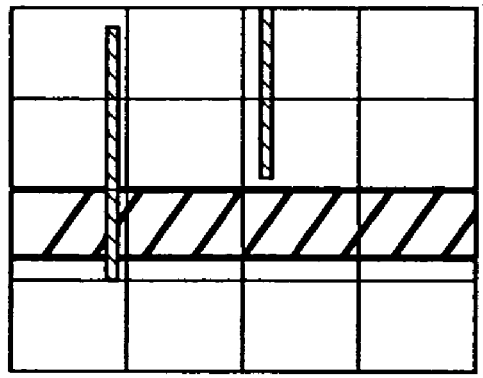
FIGS. 9A, 9B and 9C are diagrams showing an example of two images sensed at different zoom magnifications and a combination of the two images, respectively.
Figure 9B:
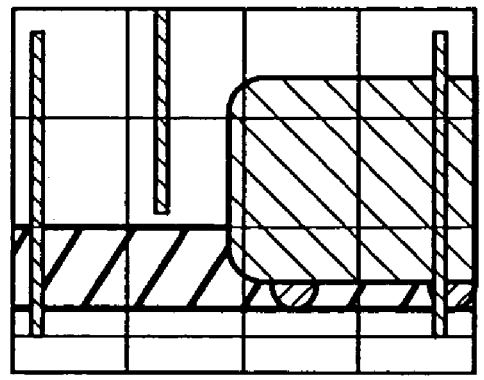

FIGS. 9A and 9B show an example of combining and displaying a mesh image with an image sensed from the same location but at different zoom magnifications. When combining these images to create a single panoramic image, one of the images is enlarged/reduced so as to be of the same size as a conventionally sensed object. For example, using FIGS. 9A and 9B, conventionally, since there is no mesh image, the two images are enlarged/reduced so that the width of the tracks becomes the same. With the conventional art, such an operation is difficult if there are few or no objects in common in the two images to be combined.

By contrast, in the present embodiment, since a mesh image linked to the zoom magnification can be generated, one of the two images can be easily enlarged or reduced as necessary in order to make the meshes of the two sensed images become the same size.

Figure 9C:
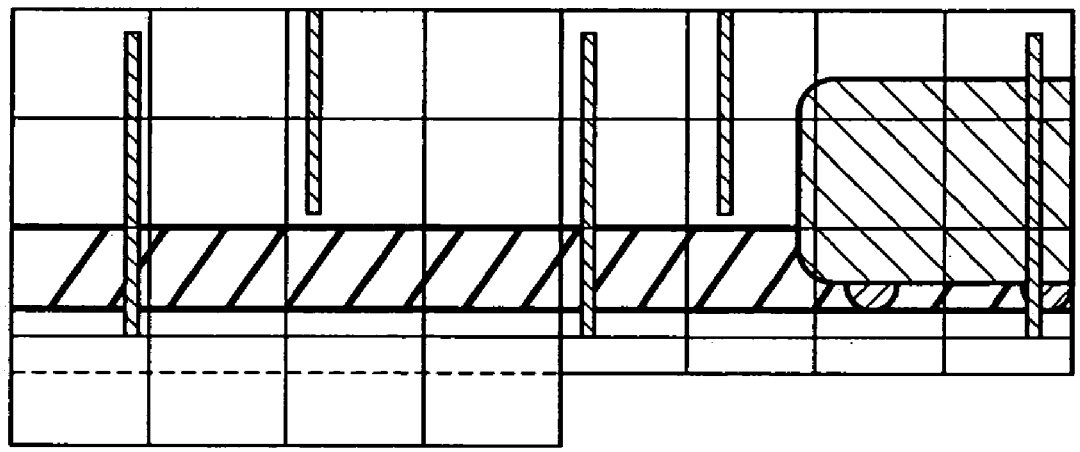

FIG. 9C, according to the present embodiment, thus shows an example of reducing the image of FIG. 9B using the mesh size as a reference in order to give the images of FIGS. 9A and 9B the same proportion. Compared to an instance of using only the objects of the images to match the sizes, by matching the sizes of the meshes adjustment is visually simple and easy even where there are no objects in common between the two images to serve as a visual reference.

The foregoing constitutes the description of the third embodiment of the present invention. The third embodiment simplifies visual confirmation of zoom magnification as well as confirmation of wide angle.

Additionally, when combining a plurality of images as in a panorama, using the configuration of the present embodiment simplifies image size matching even where the images have been sensed at different zoom magnifications.

Fourth Embodiment

A description is now given of a fourth embodiment of the present invention.

Figure 10:
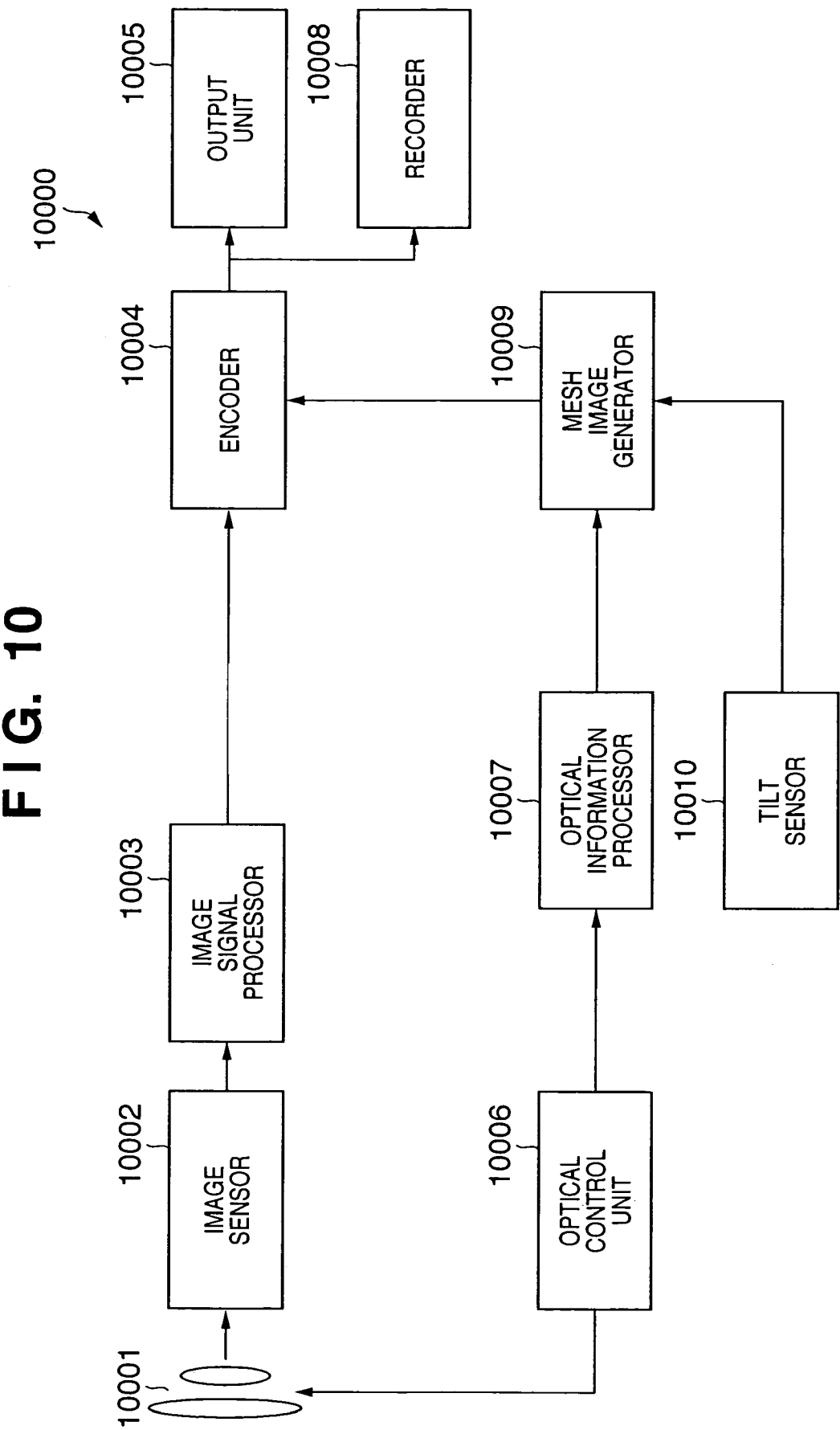
FIG. 10 is a diagram showing a configuration of an image processing apparatus according to a fourth embodiment of the present invention.

FIG. 10 is a diagram showing a configuration of an image processing apparatus according to a fourth embodiment of the present invention. Here, reference numeral 10000 denotes a digital camera, which may be a digital still camera or a digital video camera and recorder.

In FIG. 10, reference numeral 10001 denotes an optical system into which beams of light are projected from the object, 10002 denotes an image sensor having a image sensing element such as a CCD or CMOS, 10003 denotes a sensed image signal processor for processing image signals obtained from the image sensor 10002, 10004 denotes an encoder that compresses and encodes the image signal, 10005 denotes an external output unit for the compressed and encoded data, 10006 denotes an optical control unit for controlling the zoom magnification and focus adjustment of the optical system, 10007 denotes an optical information processor that acquires from control signals issued by the optical control unit information on the optical system such as the zoom state and the focus state, 10008 denotes a recorder for the compressed and encoded image data, 10009 denotes a mesh image generator (hereinafter referred to as a distortion information processor) that generates a mesh image, and 10010 denotes a tilt sensor for detecting a tilt of the digital camera 10000.

Next, a description is given of the operation of the digital camera 10000.

When light beams are projected from the object into the image sensor 10002 of the optical system 10001, sensed image signals are output from the image sensor 10002. These sensed image signals are then input to the image signal processor 3003, digitized, color separated, γ-corrected and otherwise signal processed to form object image data.

The zoom and focus of the optical system 10001 are controlled by the optical control unit 10006. The control signals that the optical control unit 10006 issues are also input to the optical information processor 10007, where the state of the zoom and focus are acquired from the control signals as optical system information and output to the mesh image generator 10009.

Additionally, the tilt sensor 10010 detects a tilt of the digital camera 10000 and outputs tilt information to the mesh image generator 10009. It should be noted that although a gyro sensor is used as the tilt sensor 10010, any apparatus or method capable of detecting a tilt of the digital camera 10000 may be employed as the tilt sensor 10010.

FIGS. 11A, 11B, 11C and 11D are diagrams showing an example of a schematic view of an object sensed at a horizontal position (11A) and its display (11C), and an example of a schematic view of an object tilted at an angle to the horizontal (11B) and its display (11D). FIGS. 12A and 12B are diagrams illustrating correction of an image tilted at an angle.

Figure 11A:
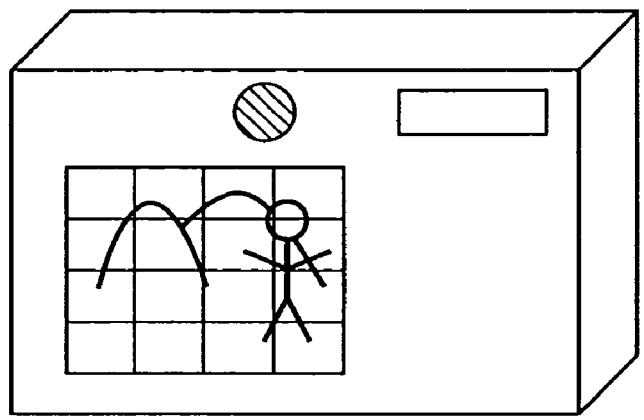
FIGS. 11A, 11B, 11C and 11D are diagrams showing an example of a schematic view of an object sensed at a horizontal position (11A) and its display (11C), and an example of a schematic view of an object tilted at an angle to the horizontal (11B) and its display (11D)
Figure 11C:
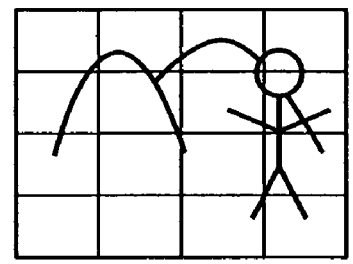
Figure 11B:
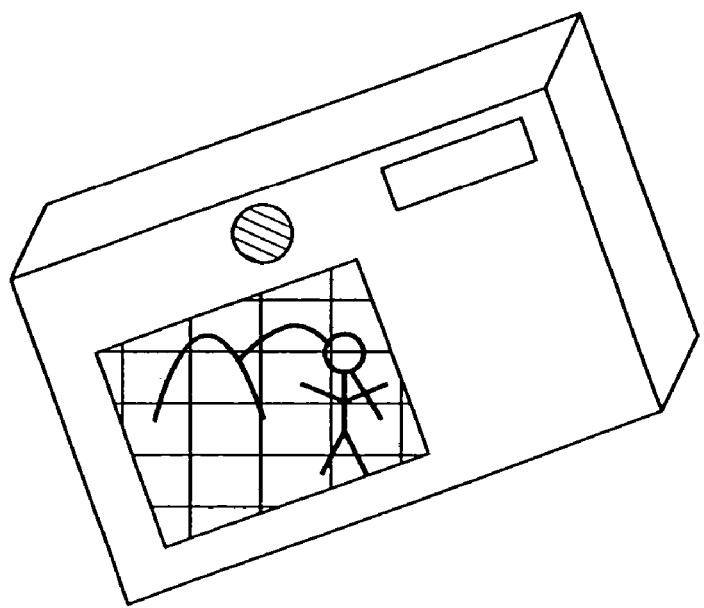
Figure 11D:
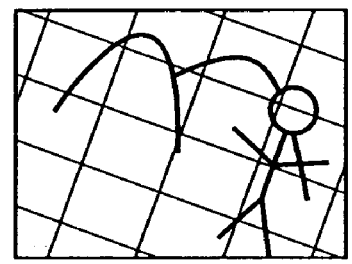
Figure 13A:
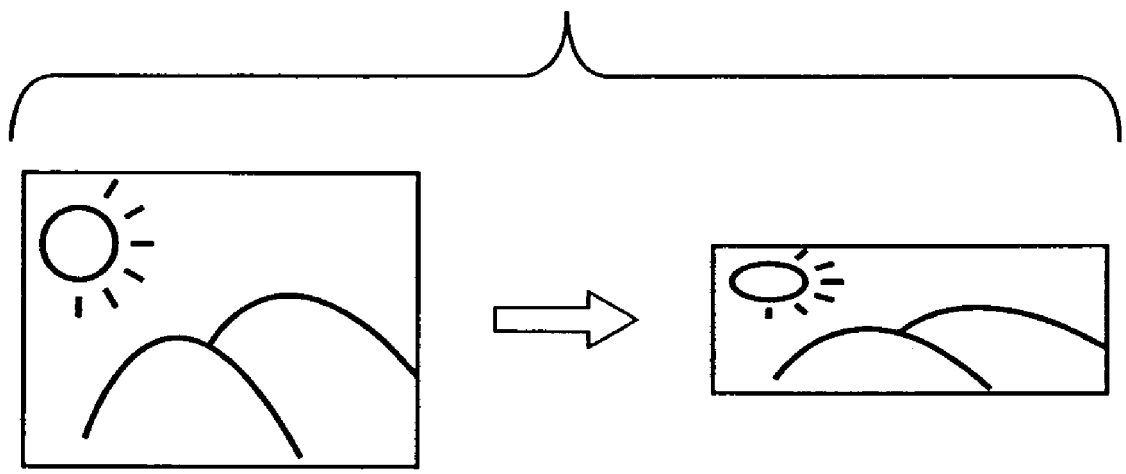
FIGS. 13A and 13B are diagrams showing examples of transforming an image using image editing software, with FIG. 13A showing an example of reducing the original image vertically and FIG. 13B showing an example of adding a special effect that twists the original image from the center.
Figure 13B:
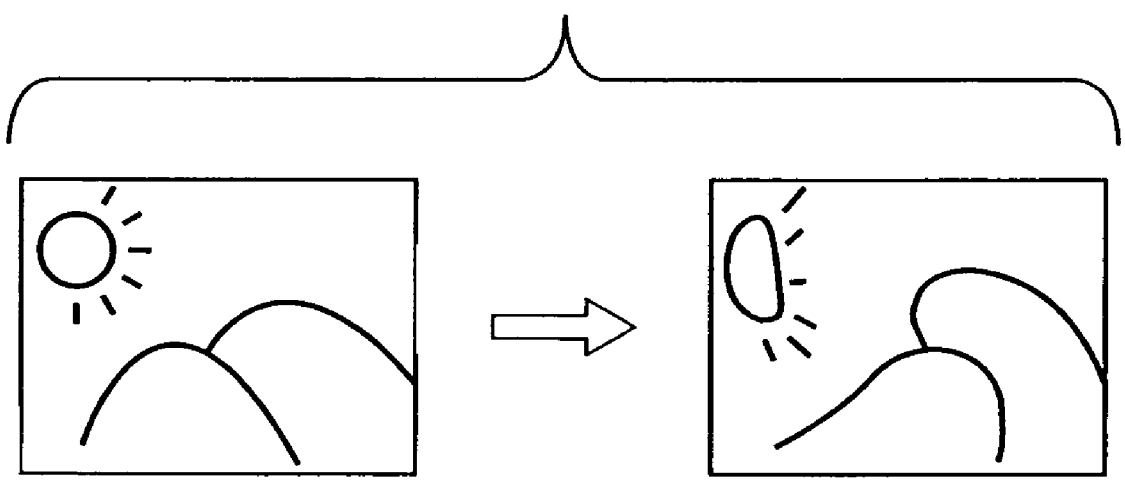
Figure 14A:
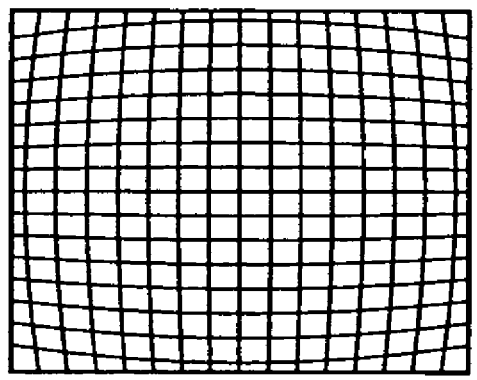
FIGS. 14A and 14B are diagrams illustrating distortion of an image.
Figure 14B:
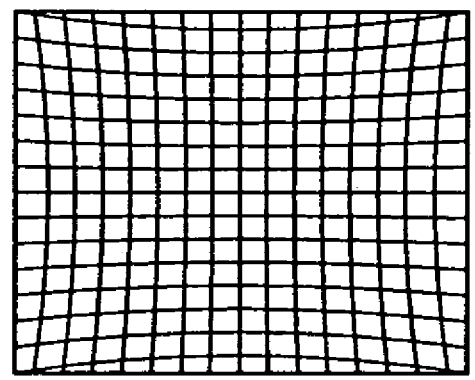

In accordance with the tilt information from the tilt sensor 10010, the mesh image generator 10009 generates a mesh image in which the liens of the mesh are always horizontal/vertical with respect to a horizontal surface. That is, when the digital camera 10000 is used to sense an image while in a horizontal state as shown in FIG. 11A, a sensed image and a mesh image like that shown in FIG. 11C are generated, and when the digital camera 10000 is used to sense an image while in a tilted state as shown in FIG. 11C, a sensed image and a mesh image like that shown in FIG. 11D are generated. In FIG. 11D, the mesh is tilted with respect to the sensed image. From the tilt of the lines of the mesh, it can be easily determined how much the apparatus was tilted when sensing the image even from the image data generated after image sensing.

Moreover, if the apparatus is tilted mistakenly and an image is sensed, the image can be easily corrected by rotating the image so that the lines of the mesh are either horizontal or vertical. Further, FIGS. 12A and 11D show images that have been rotated so that the lines of the mesh are horizontal or vertical, such that, by eliminating the angle of FIG. 12A using the mesh image as a reference, it becomes possible to generate an image like that in FIG. 12B as well. In this manner, even when correcting the tilt of an image, such correction can be easily accomplished by referring to the liens of the mesh.

Additionally, the mesh image of the present embodiment can of course be generated and displayed in combination with the mesh image described with reference to the second and third embodiments, which generate a mesh image that is distortion corrected according to wide-angle or zoom, or the zoom magnification. In such an instance, the tilt information from the tilt sensor 10010 and the optical system information from the optical information processor are combined to generate the mesh image.

The foregoing constitutes the description of the fourth embodiment. According to the configuration described above, correcting the tilt of a sensed image can be performed easily by generating and displaying a mesh image according to the tilt of the image processing apparatus.

Other Embodiments

Note that the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As described above, by generating a mesh image as one component of the image data the present invention enables the user to recognize easily a transformed state of the image and to correct, edit and otherwise process the image easily as well.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   an input unit configured to input image data including image components;
   an image processor configured to process the input image data;
   a generating unit configured to generate plane mesh image data representing a plane mesh image having equally spaced grid lines and transform the plane mesh image data by changing one of the space and the tilt angle of the grid lines, wherein the transforming of the plane mesh image data is performed according to a distortion presented in the input image data; and
   an adding unit configured to add the transformed mesh image data to the image data processed by the image processor.

2. The image processing apparatus according to claim 1, wherein the distortion occurs during capturing an image to obtain the image data.

3. The image processing apparatus according to claim 1, wherein the generating unit transforms the plane mesh image data according to attribute information included in the input image data.

4. The image processing apparatus according to claim 1, wherein the generating unit transforms the plane mesh image data according to information relating to an optical system that captures the image data.

5. The image processing apparatus according to claim 4, wherein the generating unit transforms the plane mesh image data according to information on a bulge aberration of the optical system.

6. The image processing apparatus according to claim 4, wherein the generating unit transforms the plane mesh image data according to information on a zoom magnification of the optical system.

7. The image processing apparatus according to claim 6, wherein the generating unit generates the plane mesh image data having a large mesh size when the image data has been captured on a telescopic side of the optical system and generates the plane mesh image data having a small mesh size when the image data has been captured on a wide-angle side of the optical system.

8. The image processing apparatus according to claim 4, further comprising a sensor that detects a tilt of the optical system, and wherein the generating unit transforms the plane mesh image data according to a tilt of the optical system.

9. An image processing apparatus comprising:
   an input unit configured to input image data comprising image components;
   an image processor configured to process the input image data;
   a transforming unit configured to transform an image based on the image data input by the input unit;
   a generating unit configured to generate plane mesh image data representing a plane mesh image having equally spaced grid lines and transform the plane mesh image data by changing one of the space and the tilt angle of the grid lines, wherein the transforming of the plane mesh image data is performed according to a distortion presented in the input image data;
   an adding unit configured to add the transformed plane mesh image data generated by the generating unit to the image data transformed by the transforming unit; and
   a recording unit configured to record onto a storage medium, the image data in which the mesh image data is added.

10. The image processing apparatus according to claim 9, wherein the generating unit transforms the plane mesh image data according to attribute information included in the input image data.

11. The image processing apparatus according to claim 9, wherein the generating unit transforms the plane mesh image data according to information relating to an optical system that captures the image data.

12. An image processing method, comprising:
- an input step of inputting image data including image components;
- a processing step of processing the input image data;
- a generating step of generating plane mesh image data representing a plane mesh image having equally spaced grid lines and transforming the plane mesh image data by changing one of the space and the tilt angle of the grid lines, wherein the transforming of the plane mesh image data is performed according to a distortion presented in the input image data; and
- an adding step of adding the transformed mesh image data to the image data processed by a processor that performs the processing step.

13. An image processing method, comprising:
- an input step of inputting image data comprising image components;
- an image processing step of processing the input image data by a processor;
- a transforming step of transforming an image based on the image data input by the input unit;
- a generating step of generating plane mesh image data representing a plane mesh image having equally spaced grid lines and transforming the plane mesh image data by changing one of the space and the tilt angle of the grid lines, wherein the transforming of the plane mesh image data is performed according to a distortion presented in the input image data; and
- a recording step of recording the input image data and the transformed plane mesh image data onto a storage medium.

14. A computer program stored on a computer-readable medium for causing a computer to execute the steps of:
- inputting image data including image components;
- processing the input image data;
- generating plane mesh image data representing a plane mesh image having equally spaced grid lines; and
- transforming the generated plane mesh image data by changing one of the space and the tilt angle of the grid lines, wherein the transforming of the plane mesh image data is performed according to a distortion presented in the input image data; and
- adding the transformed mesh image data to the image data processed by the processing step.

15. A computer-readable storage medium storing a computer program for causing a computer to execute the steps of:
- inputting image data including image components;
- processing the input image data;
- generating plane mesh image data representing a plane mesh image having equally spaced grid lines; and
- transforming the plane mesh image data by changing one of the space and the tilt angle of the grid lines, wherein the transforming of the plane mesh image data is performed according to a distortion presented in the input image data; and
- adding the transformed mesh image data to the image data processed by the image processing step.

* * * * *